United States Patent
Yamazaki

[11] 4,195,344
[45] Mar. 25, 1980

[54] COMPUTER SYSTEM WITH A CONFIGURATION MONITOR

[75] Inventor: Isamu Yamazaki, Kawasaki, Japan

[73] Assignee: The President of the Agency of Industrial Science and Technology, Tokyo, Japan

[21] Appl. No.: 893,407

[22] Filed: Apr. 4, 1978

[30] Foreign Application Priority Data

Apr. 8, 1977 [JP] Japan .................................. 52/39411

[51] Int. Cl.² .................... G06F 15/16; G06F 15/20
[52] U.S. Cl. ................................................. 364/200
[58] Field of Search ..................... 364/200 MS File

[56] References Cited

U.S. PATENT DOCUMENTS

| | | | |
|---|---|---|---|
| 3,226,692 | 12/1965 | Fuller et al. | 364/200 |
| 3,274,561 | 9/1966 | Hallman et al. | 364/200 |
| 3,419,849 | 12/1968 | Anderson et al. | 364/200 |
| 3,905,023 | 9/1975 | Perpiglia | 364/200 |
| 3,984,819 | 10/1976 | Anderson | 364/200 |
| 4,075,693 | 2/1978 | Fox et al. | 364/200 |

*Primary Examiner*—Harvey E. Springborn
*Attorney, Agent, or Firm*—Frishauf, Holtz, Goodman and Woodward

[57] ABSTRACT

A computer system in which the configuration of a plurality of information processing modules, which are provided in at least first and second configuration points, may be automatically monitored and supervised, comprises a plurality of switching modules provided in a third configuration point, each switching module having a configuration point number and each of the information processing modules having an identification number; and a configuration monitoring center for at least monitoring the connecting conditions between the switching modules and the configuration monitoring center for supervision of the computer system. Timing signals are delivered from the configuration monitoring center to inquire about conditions in the information processing modules and switching modules. Status lines are provided for delivering response signals representing the conditions and identification numbers of the information processing modules and configuration point numbers of the switching modules in the first and second configuration points and third configuration point to the configuration monitoring center and status distribution lines are provided for transferring the response signals from the information processing modules in the first and second configuration points to the switching modules in the third configuration point. The switching modules in the third configuration point each include a response generator which is responsive to the timing signals for delivering a combination of response signals from the information processing modules in the first and second configuration points to the configuration monitoring center by way of the status lines.

6 Claims, 9 Drawing Figures

COMPUTER SYSTEM WITH A CONFIGURATION MONITOR

BACKGROUND OF THE INVENTION

The invention relates to a computer system with information processing modules such as shared memories, computer modules, and input/output devices and, more particularly, to a computer system with a configuration monitor in which the connecting condition of the information processing modules with the computer system and the operating condition of them, i.e. the configuration of the computer system, are monitored and supervised.

A computer system is frequently provided with a plurality of input/output devices, for example, as an information processing module. By convention, in this type of computer system, identification numbers respectively are attached to the input/output devices such as card readers, line printers, magnetic tape memories, and magnetic disks. These input/output devices are sometimes disconnected or reconnected independently from the computer system during its operation for the purpose of maintenance, inspection or repair. In such a case, it is necessary to inform an operating system (OS) of the computer system of the connection or disconnection of an identification-numbered module. In the case of the connection or disconnection, the input/output (I/O) devices including the operating ones are often renumbered as to their identification numbers. The renumbering operation is manually carried out by using a switch provided on the I/O device. Then, the operator informs the OS of the identification numbers renumbered. That is, the operator communicates with the OS through a console typewriter for reporting the new identification numbers or the configuration of the I/O devices to the OS. However, when the operator makes an error in the console operation, the computer system erroneously operates or halts. Further, in the case where the computer system includes a plurality of central processing units (CPU), and these CPUs are individually connected or disconnected to and from the computer system, the operator must devote great care to the console operation, because an operation error by the operator possibly brings about serious deterioration of the reliability of the computer system.

SUMMARY OF THE INVENTION

Accordingly, an object of the invention is to provide a computer system in which the configuration of the information processing module, e.g. the place where the information processing module is positioned or the connecting condition or operating condition of the modules, may be automatically monitored and supervised.

Another object of the invention is to provide a computer system capable of automatically recognizing a connection error at the initial connection of the status lines which are connected between information processing modules such as shared memories and computer modules and a configuration monitoring center.

According to the present invention, a computer system comprises a plurality of information processing modules which are provided in at least first and second configuration points, each of the information processing modules having a identification number; a plurality of switching modules provided in a third configuration point, each switching module having a configuration point (CP) number; a configuration monitoring center for at least monitoring the connecting conditions between the switching modules and the configuration monitoring center and a source of timing signals. Timing signal lines are provided for delivering the timing signals from the configuration monitoring center to inquire about conditions of the information processing modules and switching modules in the first to third configuration points; status lines are provided for delivering response signals representing the conditions and identification numbers of the information processing modules and configuration point numbers of the switching modules in the first and second configuration points and third configuration point to the configuration monitoring center; and status distribution lines are provided for transferring the response signals from the information processing modules in the first and second configuration points to the switching modules in the third configuration point. The switching modules in the third configuration point each include a response generator which is responsive to the timing signals for delivering a combination of response signals from the information processing modules in the first and second configuration points to the configuration monitoring center by way of the status lines.

Other objects and advantages of the invention will be apparent from the following description taken in connection with the accompanying drawings.

DETAILED DESCRIPTION OF THE PREFERRED EMBODIMENT

Figure 1:
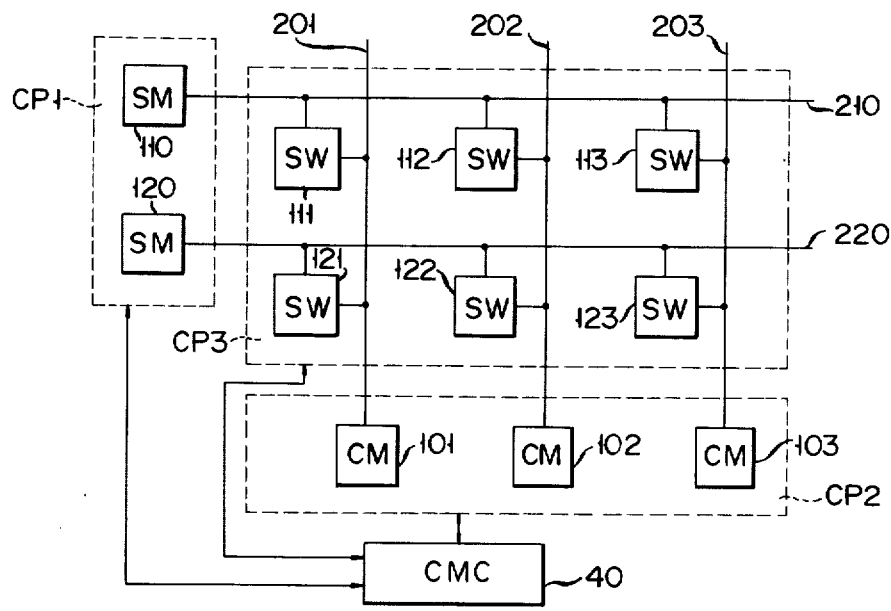
FIG. 1 schematically shows a block diagram of an embodiment of a computer system according to the invention.

Referring now to FIG. 1 there is shown an embodiment of a computer system with a configuration monitor according to the invention. In FIG. 1, a first configuration point CP1 is provided with two shared memories 110, 120 (hereinafter referred to as SM). These SMs 110, 120 correspond to a main memory of a computer system. A second modules (hereinafter referred to as CM) 101 to 103. These modules 101 to 103 correspond to a central processing unit (CPU) of the computer system. In the embodiment, two SMs 110, 120 and three CMs 101 to 103 are employed for information processing modules; however, the number of them is not limited to such numbers. I/O devices such as card readers and line printers may be included in the information processing module, in addition to the just-mentioned components. The CMs 101 to 103 are connected to memory buses 201 to 203; the SMs 110 and 120 to memory buses 210 and 220, as shown. The cross points of the memory buses 201 to 203, 210, and 220 constitute a third configuration point at which six matrix switch circuits (SW) 111, 112, 113, 121, 122, 123 are disposed connecting the crossing buses. Accordingly, data transfers between the SM 110 and the CMs 101, 102 and 103 are carried out via the matrix switch circuits 111 to 113. The data transfers between the SM 120 and the CMs 101 to 103 are carried out through the matrix switch circuits 121 to 123. The respective SMs 110 and 120, CMs 101 to 103 and SWs 111 to 113 and 121 to 123 in the configuration points CP1, CP2 and CP3 are coupled with a configuration monitoring center (CMC) 40 to permit a configuration monitoring through the transfer of signals to be referred to later between them. The signals include, for example, a timing signal for inquiry from the CMC 40, and signals representing the identification numbers of individual modules or the operating conditions. In a normal operation mode of the computer system, when the CMs 101 to 103 transfer a data transfer request to the SMs 110 and 120, the desired SM is easily designated if the corresponding identification number is used in the request signal. When a fault occurs in the SM 110, for example, an interruption signal must be transferred from the SM 110 to a fault processing CM, for example, the CM 101. At this time, the identification number for the CM 101 is transferred from the SM 110 to the CM 101. The identification numbers, of course, must be peculiar to the individual information processing modules. The identification numbers can be assigned to the corresponding modules by means of switches (to be described later) of the CMs and SMs. No identification number is assigned to the SWs 111 to 113 and 121 to 123.

Figure 2:
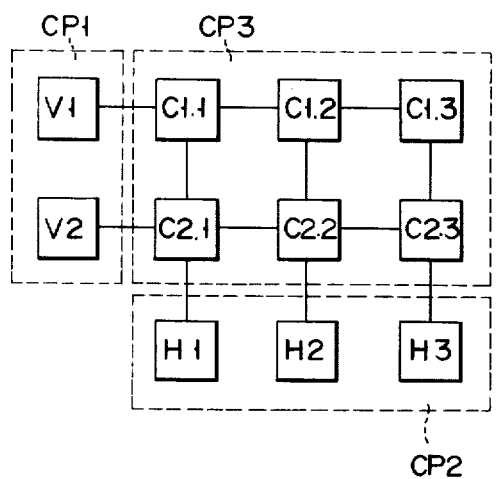
FIG. 2 shows one form of the configuration point numberings in the respective configuration points of the system in FIG. 1.

As described above, the portion including the SMs 110 and 120 is represented by the first configuration point CP1; the portion including CMs 101 to 103 by the second configuration point CP2; the portion including the SWs 111 to 113 and 121 to 123 by the third configuration point CP3. The places of the respective modules in these configuration points CP1 to CP3 are expressed by configuration point numbers (CP numbers), as shown in FIG. 2; V1 and V2 for CP1, H1 to H3 for CP2; C1.1, C1.2, C1.3, C2.1, C2.2, C2.3 for CP3. In the expression, Cn.m in the CP3 corresponds to the cross point of the Vn in the CP1 and Hm in the CP2. In the system of this example, the CMC 40 recognizes the configurations of CM, SM and SW with reference to a table in which configuration point numbers and identification numbers are correspondingly tabulated. An example of the table is as shown below.

| CP Number | Identification Number |
| --- | --- |
| V1 | 4 |
| V2 | 1 |
| H1 | 7 |
| H2 | X |
| H3 | 3 |
| C1.1 | 4-7 |
| C1.2 | 4-X |
| C1.3 | 4-3 |
| C2.1 | 1-7 |
| C2.2 | 1-X |
| C2.3 | X |

Figure 3:
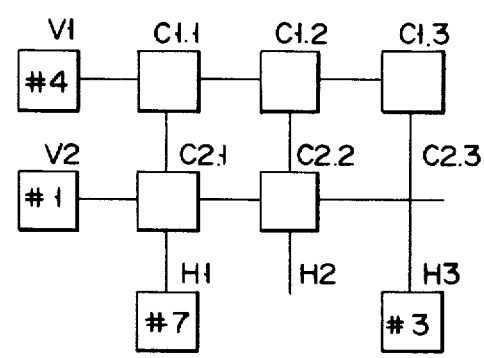
FIG. 3 shows one form of the connections of information processing modules as components of the computer system in the respective configuration points.

The SWs do not have identification numbers, as mentioned above, but have the CP numbers, and serve to transfer the identification numbers sent from the CMs and SMs to the CMC 40. In the table, the identification number corresponding to the CP number in the CP3 indicates the one thus transferred from the SW to the CMC 40. As seen from the table, the point V1 includes an SM assigned by identification number 4. Similarly, the point H2 has not a CM or it has an inoperative CM. The point C2.3 does not have an SW or although it has an SW, a power source for the SW is not turned on or two crossing bus lines are not coupled. This state shown in the table is illustrated as shown in FIG. 3. As seen from FIG. 3, the H2 and C2.3 do not have a CM and SW. When this is applied to the case of FIG. 1, the CM 102 and the SW 123 are not used.

In this system, the SM and CM provide signals representing the identification numbers and status signals representing the ON or OFF state of a power source and connection or disconnection of them with the system. These signals are transferred through the SW to the CMC 40.

Figure 4:
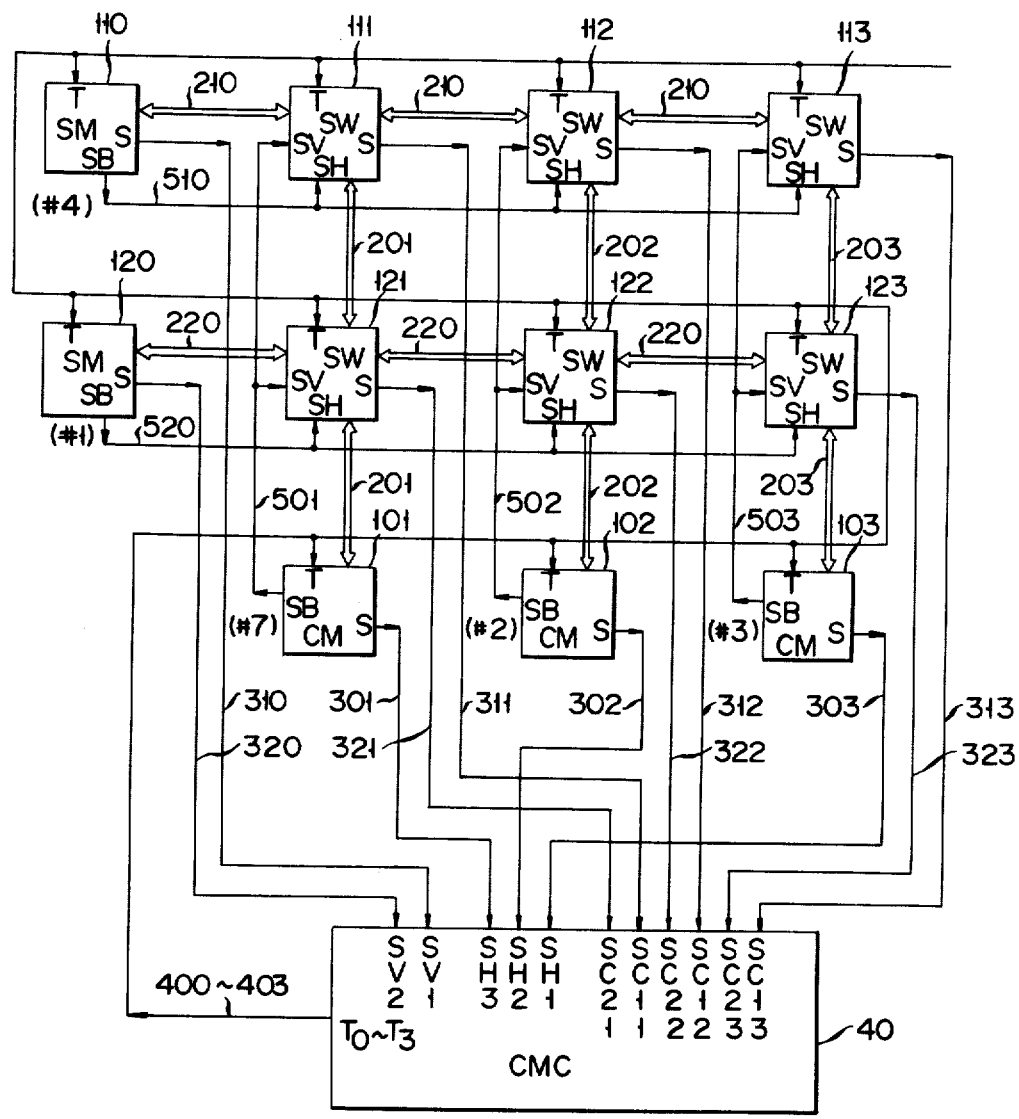
FIG. 4 shows a block diagram of the details of the computer system shown in FIG. 1.

The explanation to be given is the elaboration of the construction of the computer system of the invention. Reference is made to FIG. 4. As shown, an SM 110 of identification number 4 is positioned in a point V1 and an SM 120 of #1 is positioned in a point V2 in the first configuration point CP1. In the second configuration point CP2 a CM 101 of #7 is positioned in a point H1, a CM 102 of #2 is positioned in a point H3 and a CM 103 of #3 is positioned in a point H3. In a third configuration point CP3, an SW 111 is positioned in a point C1.1; an SW 112 in a point C1.2; an SW 113 in a point C1.3; an SW 121 in a point C2.1; an SW 122 in a point C2.2; an SW 123 in a point C2.3.

In connection, a memory bus 210 connects commonly the SM 110, SW 111, SW 112 and SW 113. A memory bus 220 commonly connects the SM 120, SW 121, SW 122 and SW 123. A memory bus 201 connects the CM 101, SW 111 and SW 121; a memory bus 202, the CM 102, SW 112 and SW 122; a memory bus 203, the CM 103, SW 113 and SW 123.

The following various signal lines are used for the configuration monitoring of the SM, SW and CM. First status lines are derived from all the information processing modules to the CMC 40. S terminals of the SMs 110 and 120 are coupled with SV1 and SV2 terminals of the CMC 40 via first status lines 310, 320, respectively. S terminals of the CMs 101 to 103 are coupled with terminals SH1 to SH3 of the CMC 40 via status lines 301 to 303, respectively. S terminals of SWs 111 to 113 and 121 to 123 are connected to terminals SC11 to SC13 and SC21 to SC23 via status lines 311 to 313 and 321 to 323, respectively.

Status distribution lines are used to couple the SMs and CMs with the SWs. The SB terminal of the SM 110 is connected to the SH terminals of the SWs 111 to 113 via a first status distribution line 510. The SB terminal of the SM 120 is connected to the SH terminals of the SWs 121 to 123 via a second status distribution line 520. The SB terminals of the CMs 101 to 103 are connected to the SV terminals of the SWs 111 and 121, 112 and 122 and 113 and 123 via status distribution lines 501 to 503, respectively.

Four timing signal lines 400 to 403 are connected to T ($T_0$ to $T_3$) terminals of the CMC 40 (for simplicity, only a single line is illustrated in the drawing) which in turn are connected to the terminals T ($T_0$ to $T_3$) of all the CMs, SWs and SMs.

Figure 5:
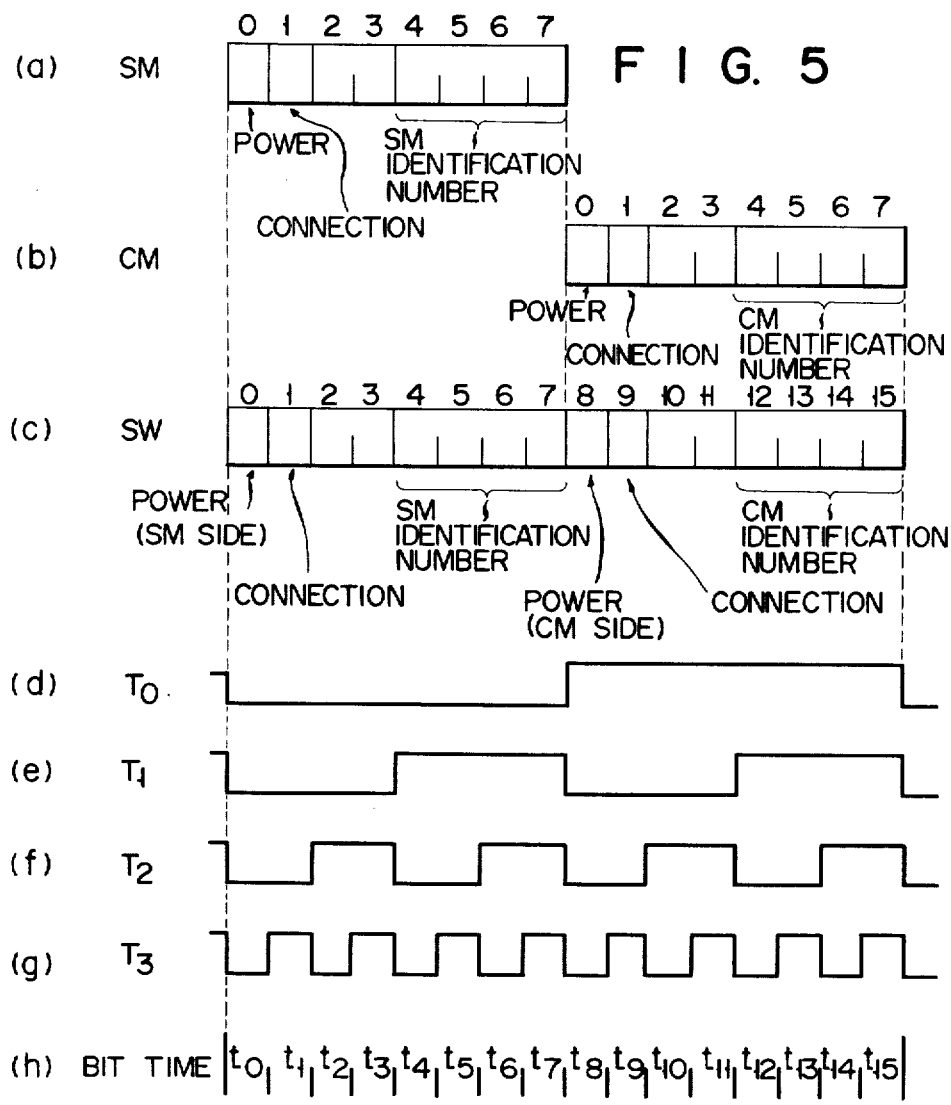
FIG. 5 shows a set of timing charts useful in illustrating the operation of the system in FIG. 4.

An explanation will be given of the operation of the computer system of the invention with reference to FIG. 5. When the CMC 40 monitors the configurations of the individual information processing modules, timing signals as shown in FIGS. 5(d) to 5(g) are delivered from the terminal T ($T_0$ to $T_3$) to the timing signal lines 400 to 403 in accordance with bit times $t_0$ to $t_{15}$ shown in FIG. 5(h). In the specification, the bit times $t_0$ to $t_7$ are collectively called a first time period and the rest of the time bits $t_8$ to $t_{15}$, a second time period. When the timing signals transferred via the timing signal lines 400 to 403 are inputted to the terminals T ($T_0$ to $T_3$) of the SMs, CMs and SWs, these modules produce response signals as shown in FIGS. 5(a) to 5(c). The response signals of the SM and CM are each constructed by 8 bits; bit 0 indicates ON or OFF state of the power; bit 1 connection or disconnection of them with the memory buses 210 and 220 or 201 to 203; bits 2 and 3 are not used; bits 4 to 7 represent an identification number. The SMs 110 and 120 produce the response signals to be sent out from the terminals S and SB onto the first and second status distribution lines 310 and 320, and 510 and 520 in the first time period $t_0$ to $t_7$. Similarly, the CMs 101 to 103 produce the response signals which in turn are sent out from the terminals S and SB onto the first and second status distribution lines 301 to 303 and 501 to 503, in the second time period $t_8$ to $t_{15}$. Receiving at the terminals SH and SV via the first status distribution lines 510 and 520, and 501, 502 and 503 the signals (16 bits in total) from the respective SMs and CMs, the SWs 111 to 113 and 121 to 123 successively produce the response signals at the terminals S in the first and second time periods $t_0$ to $t_7$ and $t_8$ to $t_{15}$ and then send to the first status distribution lines 311 to 313 and 321 to 323.

Figure 8:
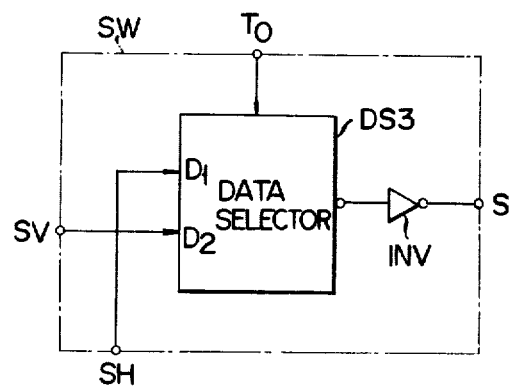
FIGS. 6 to 8 show response signal generating circuits provided in the shared memories, computer modules and switch circuits shown in FIG. 4.
Figure 6:
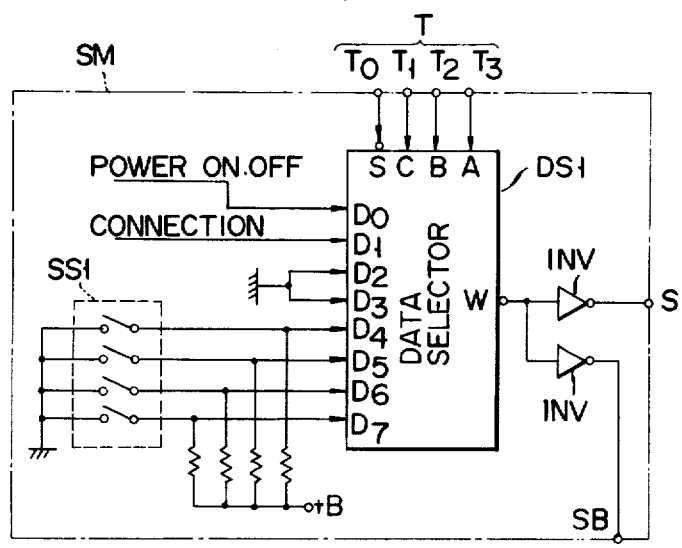
Figure 7:
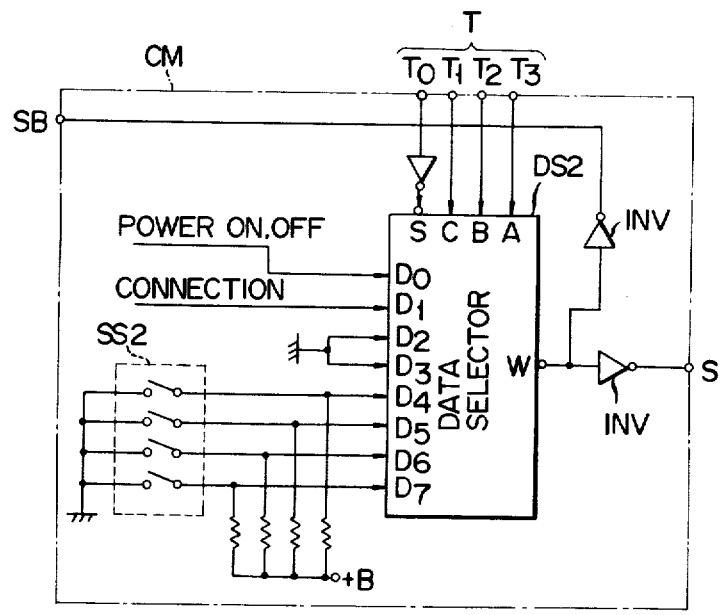

FIGS. 6, 7 and 8 show the details of the response signal generating circuits provided in the modules SMs, CMs and SWs. In FIGS. 6 and 7, DS1 and DS2 designate data selectors for successively selecting the data for power ON or OFF, the data for connection or disconnection and the data for the identification numbers in response to the timing signals shown in FIGS. 5(d) to 5(g) received at the terminals T ($T_0$ to $T_3$). SS1 and SS2 are switches for manually setting up the identification numbers. INVs are inverters for output buffer gates. In FIG. 8, DS3 is a data selector for successively selecting the response signals from the SMs and CMs which are received at the terminals SH and SV, in response to the timing signals inputted to the terminal T ($T_0$). INV is an inverter for an output buffer gate.

The CMC 40 receives the response signals from the respective CMs, SMs and SWs through first status distribution lines 310 and 320, 301 to 303, 311 to 313 and 321 to 323 and monitors the configurations of those modules and supervises them. From the identification numbers included in the response signals from the SMs and CMs, the kind of the module positioned in a configuration point or the presence of the module is monitored. The status signals in the response signals show the condition of power ON or OFF, or connection or disconnection of the modules to the computer system. The response signal from the SWs shows connecting conditions between the SMs and CMs. The identification numbers included in the response signals indicate connection errors of the status distribution lines or the buses at the initial connection stage of the system.

Figure 9:
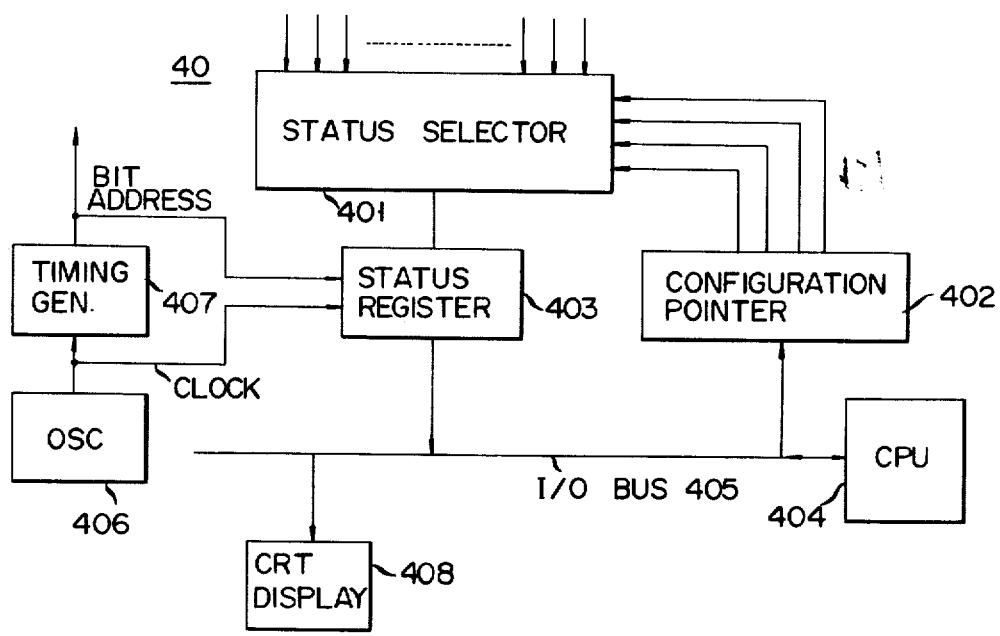
FIG. 9 shows a block diagram of the configuration monitoring center in FIG. 4.

The details of the CMC 40 will be given with reference to FIG. 9. The data from the respective information processing modules 101 to 103, 110, 120, 111 to 113, and 121 to 123 are inputted into a status selector 411. The status selector 411 is a 16-input data selector. The selector 411 selects any one of 16 inputs by a select signal of 4 bits from a configuration pointer 412 which is a 4-bit latch and produces the selected one toward a status register 413. The register 413 is constructed by a 16-bit addressable latch. The configuration pointer 412 receives a select instruction from the CPU 404 via an I/O bus 405 to execute a selection operation. The status register 413 receives a clock signal (corresponding to the clock signal in the bit time of FIG. 5(h)) from an OSC (oscillator) 406 and a bit address signal from a timing generator 407 and transfers the data from the status selector 411 to the I/O bus 405. The timing signal generator 407 is a 4-bit counter which produces the bit address signal every four bits of counting. Thus, the data from the configuration points of the CP1, CP2 and CP3 are successively applied to the CMC 40 and the configuration of the computer system is displayed on a graphic CRT display 408 connected with the I/O bus 405. If the display of the configuration is made in the form as shown in FIG. 3, we can see no information processing module exists in the points H2 and C2.3.

As described above, the CMC delivers the timing signals indicating at least first and second time periods via the common timing signal line to the respective information processing modules. On the other hand, the information processing modules deliver back the signals representing the identification numbers and the state of the processing modules by way of the first status distribution lines in a given time instructed by the instruction signal or send out them onto the second status distribution lines or relays the response signal coming through the second status distribution lines from the information processing modules to the first status distribution lines. In this manner, the CMC centralizingly auto-monitors the configuration of the information processing modules, i.e. the identification numbers, the power condition, or the connecting condition of them. Additionally, it may detect the error of the initial connection of the modules with the computer system.

Accordingly, the invention remarkably reduces and simplifies the work of an operator for the supervision of the computer system so that errors by the operator are minimized with improvement of the reliability and operation of the system.

It will be understood that the invention is not limited to the above-mentioned embodiment. For example, a part of the response signals mentioned above may be used or additional status signals may be used. The matrix switch does not necessarily transfer all of the response signals from the computer modules or the shared memories. That is, a part of them, for example, only the identification signal, may be outputted from the matrix switches. In the above-embodiment, computer modules, shared memories and matrix switches are used for the information processing modules; however, other suitable components may be used.

What is claimed is:

1. A computer system comprising:
   a plurality of information processing modules which are provided in at least first and second configuration points, each of said information processing modules having an identification number;
   a plurality of switching modules provided in a third configuration point, each switching module having a configuration point (CP) number;
   a configuration monitoring center for at least monitoring connecting conditions between said switching modules and the configuration monitoring center;

a source of timing signals included within the monitoring center;

timing signal lines coupled to said information processing modules and to said switching modules for delivering said timing signals from said configuration monitoring center to inquire about conditions of said information processing modules and switching modules in said first to third configuration points;

status lines coupling said information processing modules and switching modules to said configuration monitoring center for delivering response signals representing the conditions and identification numbers of said information processing modules and configuration point numbers of the switching modules in said first and second configuration points and said third configuration point to said configuration monitoring center;

status distribution lines coupled between said information processing modules and said switching modules for transferring said response signals from said information processing modules in said first and second configuration points to said switching modules in said third configuration point;

said switching modules in said third configuration point each including means responsive to said timing signals for delivering a combination of response signals from said information processing modules in said first and second configuration points to said configuration monitoring center by way of said status lines.

2. A computer system according to claim 1, further comprising a plurality of first buses arranged in rows and a plurality of second buses arranged in columns, said first buses being connected to said information processing modules in said first configuration point by way of said switching modules in said third configuration point, said second buses being connected to said information processing modules in said second configuration point by way of said switching modules in said third configuration point, and data to be processed in said information processing modules in said first and second configuration points being transferred thereto via said switching modules in said third configuration point.

3. A computer system according to claim 1, comprising a source of power, and wherein each of said information processing modules in said first and second configuration points includes means for forming response signals representing the ON or OFF condition of the source of power, and the connecting or disconnecting condition of said information processing modules with the computer system.

4. A computer system according to claim 3, in which said response signal forming means includes a data selector for successively selecting data representing the ON or OFF condition of the source of power and the connecting or disconnecting with the computer system; a manually operable switch unit for forming identification numbers; and an output buffer gate circuit to which the output signals from said data selector are applied.

5. A computer system according to claim 1, in which said switching modules in said third configuration point includes a data selector which receives the response signals from said information processing modules in said first and second configuration points to produce said combination of response signals in response to said timing signals, and an output buffer gate circuit to which the output signals of said data selector are applied.

6. A computer system according to claim 1, in which said configuration monitoring center comprises a status selector to which the response signals from said information processing modules in said first and second configuration points are applied; a configuration pointer for providing a selection signal to said status selector; a central processing unit for providing a selection instruction signal to said configuration pointer; an input/output (I/O) bus connected to said CPU; a clock oscillator for generating a clock signal; a timing generator for forming said timing signals from the clock signal received from said clock oscillator; a status register which receives said timing signals and produces a response signal representing the configuration of the computer system, the response signal being selected by said status selector toward said I/O bus; and a CRT display for visually displaying the configuration of the computer system represented by said response signal produced by said status register.

* * * * *